United States Patent [19]
Van Patten et al.

[11] Patent Number: 5,020,467
[45] Date of Patent: Jun. 4, 1991

[54] BALLOON SIGNALLING SYSTEM

[76] Inventors: Norman Van Patten, 564 S. 1st East, Springville, Utah 84663; Blaine Van Patten, 16 La Vesta Verde-Rancho, Palo Verde, Calif. 90274

[21] Appl. No.: 345,363

[22] Filed: May 1, 1989

[51] Int. Cl.$^5$ .............................................. B64B 1/50
[52] U.S. Cl. ............................. 116/210; 116/DIG. 9
[58] Field of Search .......... 116/210, DIG. 8, DIG. 9; 206/573, 803; 244/33; 441/30

[56]  References Cited
U.S. PATENT DOCUMENTS

| | | | |
|---|---|---|---|
| 2,862,531 | 12/1958 | Walker | 141/317 |
| 3,381,655 | 5/1968 | Rozzelle | 116/210 |
| 3,735,723 | 5/1973 | Lutz | 116/210 |
| 3,941,079 | 3/1976 | McNeill | 116/210 |
| 4,044,711 | 8/1977 | Jamison | 116/210 |
| 4,094,267 | 6/1978 | Davis, Jr. | 116/210 |
| 4,219,819 | 8/1980 | Patel | 343/18 B |
| 4,416,433 | 11/1983 | Bellina | 244/33 |
| 4,586,456 | 5/1986 | Forward | 116/210 |
| 4,800,835 | 1/1989 | Mears | 116/210 |
| 4,836,128 | 6/1989 | Walker | 116/210 |
| 4,872,414 | 10/1989 | Asquith et al. | 116/210 |

FOREIGN PATENT DOCUMENTS 2543713 10/1984 France ................................. 116/210

Primary Examiner—William A. Cuchlinski, Jr.
Assistant Examiner—W. Morris Worth
Attorney, Agent, or Firm—Thorpe, North & Western

[57]  ABSTRACT

A balloon signalling system includes a hollow, generally cylindrical casing having a container section with an upper open end and a bottom closed end, and a cap placeable on the upper end of the container section to form an enclosure. Also included is a spool on which a string may be wound, with the spool being disposed in the container section near the bottom end thereof to rotate about a transverse axis. A cartridge containing lighter-than-air gas under pressure is disposed in the container section above the spool so that a nozzle end of the cartridge protrudes from the container section when the cap is removed. A valve is disposed in the nozzle end of the cartridge and is manually operable from a closed position to an open position to allow gas to escape from the cartridge out the nozzle end and into a balloon which is mounted on the nozzle end. The balloon is dimensioned to fit in the cap when deflated and includes a mouth which may be placed over the nozzle and to secure the balloon to the cartridge.

8 Claims, 1 Drawing Sheet

U.S. Patent — June 4, 1991 — 5,020,467
Fig. 1
Fig. 2
Fig. 3
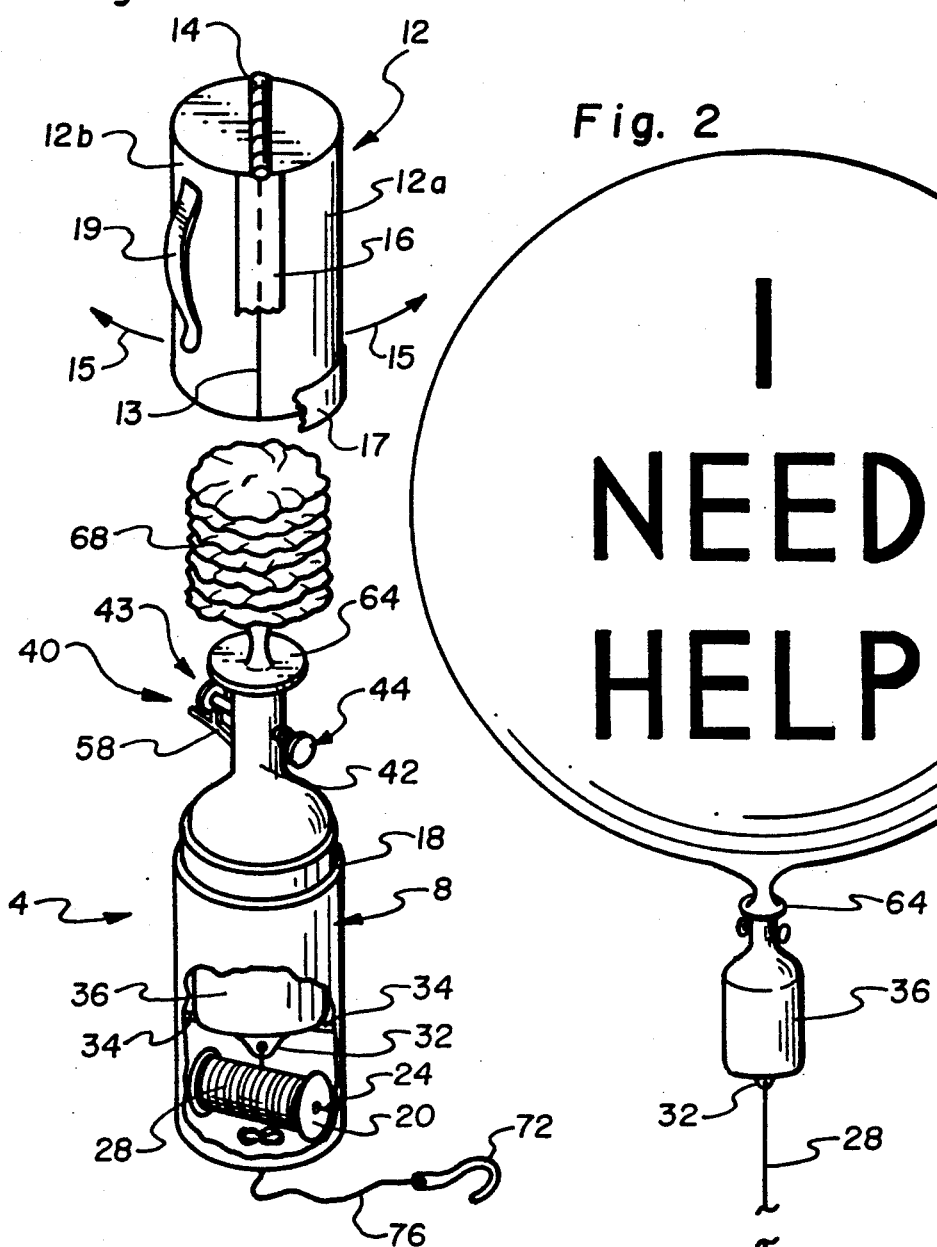
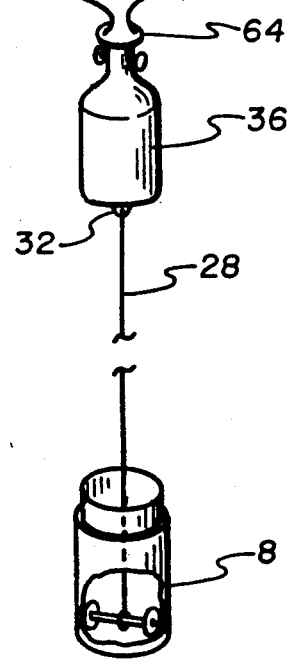
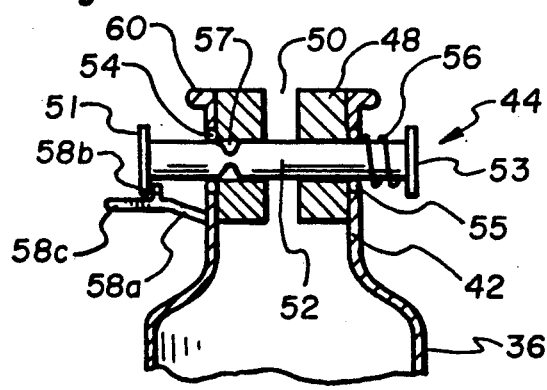

BALLOON SIGNALLING SYSTEM

BACKGROUND OF THE INVENTION

This invention relates to a compact, portable balloon signalling system by which a person may identify his/her location if lost or injured.

Emergency signalling systems utilizing inflatable balloons have been known for some time as evident by U.S. Pat. Nos. 2,862,531, 3,381,655, 3,735,723, 3,941,079, 4,094,267, 4,416,433 and 4,800,835. Such devices are designed generally to allow for inflation and elevation of a balloon to mark the location of a lost or injured party. These devices are especially useful in heavily wooded, mountainous or remote locations. The balloon, which is elevated above the person in distress, is more easily seen by both airborne and ground based search parties than would be the distressed person himself, to thus enable the rapid location and bringing of aid to the person.

The devices heretofore proposed have typically been either cumbersome, bulky and difficult to manipulate and use or overly complicated in construction and thus quite costly.

SUMMARY OF THE INVENTION

It is an object of the invention to provide a simple and inexpensive balloon signaling device for indicating location of a person in distress.

It is also an object of the invention to provide such a device which is simple to use and operate.

It is a further object of the invention to provide such a device which may be easily repackaged and reused.

It is an additional object of the invention to provide a compact, portable balloon signaling device easily carried by a person in a coat or shirt pocket.

It is another object of the invention to provide such a device which is rugged and reliable.

The above and other objects of the invention are realized in a specific illustrative embodiment of a balloon signalling system which includes a hollow, generally cylindrical casing having a container section with an upper open end and a bottom closed end, and a cap for placement on the upper end of the container section. Also included is a spool on which a string may be wound, with the spool being disposed in the container section near the bottom end thereof to rotate about a transverse axis. A cartridge containing lighter-than-air gas under pressure is disposed in the container section above the spool; the cartridge includes a neck section and nozzle end which protrudes from the container section of the casing when the cap is removed to expose a valve key which extends laterally from the neck of the cartridge and is manually operable by a user. The valve key is connected to a valve so that when the valve key is moved to a certain position, the valve is opened to allow gas to escape from the cartridge out the nozzle end thereof. The other end of the cartridge is attached to a free end of a string wound on the spool. Also included is an inflatable balloon dimensioned to fit in the cap when deflated and having a mouth through which gas may pass into and out of the balloon. The balloon is disposed with the mouth placed about the nozzle of the cartridge so that when the valve key is moved, gas will escape from the cartridge and into the balloon to inflate the balloon. When the balloon is inflated to a certain volume, it will begin to rise and pull the cartridge from the casing, and the cartridge, in turn, will pull the string to unwind it from the spool. The balloon will continue to inflate until the cartridge is spent and will rise until the string is played out to then stop further rising of the balloon. Of course, selection of the string length will determine the height to which the balloon can reach to signal the location of the person using the device.

BRIEF DESCRIPTION OF THE DRAWINGS

The above and other objects, features and advantages of the invention will become apparent from a consideration of the following detailed description presented in connection with the accompanying drawings in which:

FIG. 1 shows a partially exploded, partially cut-away view of a balloon signalling system made in accordance with the principles of the present invention;

FIG. 2 shows the system of FIG. 1 with the balloon inflated, holding the gas cartridge above the casing in which the balloon and cartridge are initially packed; and FIG. 3 is a cross-sectional view of the neck and valve of the gas cartridge.

DETAILED DESCRIPTION

Referring to the drawings, there is shown a balloon signalling system which includes a hollow, generally cylindrical casing 4 (FIG. 1) comprising a lower container section 8 and an upper cap section 12. The cap section 12 is divided into two parts 12a and 12b along a line 13, and includes a hinge 14 (or could be a thin, bendable plastic joint) at the top of the cap section to allow the two parts 12a and 12b to pivot outwardly from one another and upwardly as indicated by arrows 15. A piece of tape 16 holds the two parts 12a and 12b together (until the tape is removed) and a piece of tape 17 holds the cap section 12 on the container section 8 (until removal). The cap section 12, when placed on the container section 8, rests on a shoulder 18 formed in the side wall of the container section.

The casing 4 has a long dimension of about six inches to one foot, and a diameter of about one-half inch to three inches, to enable carrying the casing in a coat pocket. A clip 19 is provided on the cap section 12 to allow inserting and holding the casing 4 in a deep pocket, inside a belt, or the like. The casing 4 could illustratively be made of metal, plastic or other sturdy material.

Disposed in the container section 8 of the casing 4 at the bottom thereof is a freely rotatable spool 20 mounted to rotate on an axle 24 which extends transversely (to the cylindrical axis of the casing 4) between the side walls of the container section. The ends of the axle 24 could either be attached to the inside surface of the walls of the container section 8 or extend through small holes in the side walls and fixed in position. A tether or string 28 is wound about the spool with the free end of the string attached to an eyelet 32 located at the bottom of a lighter-than-air gas filled cartridge 36. The string 28 could be conventional twine, fishing line, or the like. The spool 20 could be made of wood, plastic, metal, etc.

The cartridge 36 is disposed in the container section 8 of the casing 4 to rest on stops 34 which project inwardly from the interior surface of the side walls of the container section, so that an upper, nozzle-end 40 of the cartridge protrudes out of the container section as shown in FIG. 1. The nozzle-end 40 includes a neck 42 in which is disposed a valve 43 for either preventing the escape of gas, when a valve key 44 is in one position and for allowing the escape of gas when the valve key is moved to another position.

The valve is shown in FIG. 3 which illustrates a cross-sectional view of the neck 42 of the cartridge 36. Disposed in the neck 42 of the cartridge 36 is a plug 48 made, for example, of polyurethane. The plug 48 includes a centrally-positioned, cylindrical bore 50 through which gas may flow into or out of the cartridge. The valve key 44, which may be made of polyurethane or metal, includes a cylindrical push rod 52 disposed in the neck 42 and plug 48 to slide transversely thereon, and two end buttons 51 and 53. O-rings 54 and 55 are positioned about the rod 52 in opposite walls of the neck 42, to provide a seal. A coil spring 56 is positioned about he rod 52 between the neck 42 and button 53 to urge the rod to the right. The rod 52 includes a pinched or narrowed segment 57 which, when moved to a position in the bore 50 (rod 52 moved to the right in FIG. 3), allows gas to flow from the cartridge 36 and out the bore. when the narrowed segment 57 is pushed out of the bore 50 (to the left in FIG. 3), the rod 52, which has a larger diameter than the bore 50, fills and blocks the bore and the passage of gas therethrough. A catch element 58 includes a shank 58a which projects outwardly from the neck 42, and a finger 58a which projects upwardly from the shank. The shank 58a is flexible so that it may be deflected downwardly. The valve 43 is normally held in the closed position by positioning the finger 58b behind button 51 to prevent the rod 52 from moving to the open position (to the right in FIG. 3). By pressing the end 58c of the shank 58a downwardly, the finger 58b is removed from behind the button 51 to allow the spring 56 to force the rod 52 to the right (in FIG. 3) to thereby open the valve.

With continued reference to FIG. 3, there is shown a lip 60 which circumscribes the opening of the neck 42 of the nozzle-end of the cartridge. This lip 60 is provided to allow retention of the mouth 64 of a balloon 68 over the neck 42 of the cartridge. The mouth 64 of the balloon 68 is simply fitted over the lip 60 and down over the neck 42 so that the lip, being wider than the neck, inhibits the sliding off of the mouth of the balloon.

The balloon 68 is dimensioned so that when folded, as shown in FIG. 1, it would fit within the cap section 12 of the casing 4 when the cap section is placed onto the container section 8. The balloon 68 is of sufficient size such that when filled with lighter-than-air gas, it will rise and carry the cartridge 36 upwardly with the balloon as shown in FIG. 2. The words "I NEED HELP" are painted or inscribed onto the balloon 68 to indicate to an observer that there is a distress situation needing assistance. The balloon could be of conventional design and fabrication and be made of rubber, resilient plastic, or the like.

In use, the balloon 68 would be folded to fit within the cap section 12 of the casing 4 and the cap section would then be taped closed and onto the container section 8 to allow convenient storing or carrying of the casing. For example, the casing could be slipped into a pocket or inside a belt, with the clip 16 placed over the edge of the pocket or over the belt to hold the casing in place. Then, when the party using the device was put in a distress situation where he/she needed to signal for help, the tape 16 and 17 would be removed to allow easy removal of the cap section 12 from the container section 8 to thereby expose the balloon 68, nozzle-end of the cartridge 36, valve key 44 and catch element 58.

The catch element 58 is deflected downwardly to allow the push rod 52 to be moved to open the valve 43 and allow the escape of gas, such as helium, from the cartridge 36 through the bore 50 and balloon mouth 64 into the interior of the balloon 68 to inflate the balloon. As the balloon 68 inflates, it will reach a point where it has sufficient buoyancy to pull the cartridge 36 from the casing 4 upwardly as shown in FIG. 2 and carry the free end of the string 28, which is attached to the eyelet 32 of the cartridge. As the string 28 is pulled upwardly, it unrolls from the spool 20. The balloon 68 will continue to inflate from the gas in the cartridge 36 until the pressure in the cartridge equals the pressure in the balloon. The balloon will continue to rise until all of the string 28 has played out from the spool 20 except an end which is tied to the spool, at which time the string will prevent further elevation of the balloon. The container section 8 of the casing 4 will be held and retained by the person producing the signal so that it does not rise with the balloon. Alternatively, a hook 72 and tether 76 attached to the bottom of the container section 8 could be further tied to a tree or rock so that the person in distress would not need to continue holding onto the container section 8. When help arrived, the person in distress could simply reel in the string, roll it up again on the spool 20, replace the cartridge 36 in the container section 8 and fold the balloon 68, after allowing release of the gas from the balloon, into the cap section 12. The cartridge 36 could then be later filled with gas again for a subsequent use.

In the manner described, a simple, easy-to-use, rugged and effective balloon signalling device is provided. The device is designed to enable reuse thereof simply by refilling the gas cartridge.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. For example, the valve key 44 of the valve 43 could be made rotatable, rather than slidable, to cover and block the bore 50 in one position and allow passage of gas in another position.

What is claimed is:

1. A balloon signalling system comprising
   a hollow, generally cylindrical casing having a container section formed by a contiguous, cylindrical sidewall, an upper open end and a bottom closed end, said casing further having a cap placeable on and removable from the upper end of the container section,
   a spool on which a tether may be wound, said spool being disposed in the container section near the bottom end thereof to rotate about an axis which is generally transverse with the cylindrical axis of the casing,
   a cartridge containing lighter-than-air gas under pressure and including a tether attachment end and a nozzle end, said nozzle end having a valve disposed therein, and a valve mechanism extending from the nozzle end for grasping to enable opening of the valve to allow gas to escape from the cartridge through the nozzle end, said tether attachment end having means for attaching the cartridge to a tether, and an inflatable balloon having an opening which fits over and is retainable on the nozzle end of the cartridge so that when the valve is opened, gas flows from the cartridge to the balloon to inflate the balloon, said balloon being collapsible to fit within the cap of the casing, said cartridge being dimensioned for insertion into the container section of the casing so that the cartridge is enclosed completely within said casing, with the nozzle end and valve mechanism being exposed when the cap is removed from the container section.

2. A signalling system as in claim 1 wherein said nozzle end of the cartridge comprises a neck, and a flange which circumscribes the neck and over which the balloon opening may be placed.

3. A signalling system as in claim 1 wherein said attaching means comprises an eyelet through which a tether may be inserted.

4. A signalling system as in claim 1 wherein the nozzle end of the cartridge includes a neck portion, a plug disposed in the neck portion and having a bore therein which is generally parallel with the neck and through which gas may pass into and out of the cartridge, and a cross opening extending transversely through the neck portion and plug to intersect with the bore, said bore having a smaller width than the width of the opening, and wherein said valve includes a valve key moveably disposed in the cross opening to block passage of gas through the bore in one position, and allow the passage of gas through the bore in another position.

5. A signalling system as in claim 4 wherein said valve key comprises a push rod slidably disposed in the cross opening and having a narrowed section, said rod being moveable between said one position, in which the narrowed section is pushed out of alignment with the bore to block the passage of gas, and said other position, in which the narrowed section is pushed into alignment with the bore to allow the passage of gas therepast.

6. A signalling system as in claim 1 further including a shirt pocket clip mounted on the side exterior of the casing cap.

7. A signalling system as in claim 1 wherein said cap is formed of two side parts hingedly joined at the top of the cap to allow the two side parts to pivot apart.

8. A balloon signalling system comprising
a hollow, generally cylindrical casing having a container section with an upper open end and a bottom closed end, and a cap placeable on and removable from the upper end of the container section,
a spool on which a tether may be wound, said spool being disposed in the container section near the bottom end thereof to rotate about an axis which is generally transverse with the cylindrical axis of the casing,
a cartridge containing lighter-than-air gas under pressure and including a tether attachment end and a nozzle end, said nozzle end having a valve disposed therein, and a valve mechanism extending from the nozzle end for grasping to enable opening of the valve to allow gas to escape from the cartridge through the nozzle end, said tether attachment end having means for attaching the cartridge to a tether, and
an inflatable balloon having an opening which fits over and is retainable on the nozzle end of the cartridge so that when the valve is opened, gas flows from the cartridge to the balloon to inflate the balloon, said balloon being collapsible to fit within the cap of the casing,
said cartridge being dimensioned for insertion into the container section of the casing so that the nozzle end and valve mechanism are exposed when the cap is removed from the container section,
said nozzle end of the cartridge includes a neck portion, a plug disposed in the neck portion and having a bore therein which is generally parallel with the neck and through which gas may pass into and out of the cartridge, and a cross opening extending transversely through the neck portion and plug to intersect with the bore, said bore having a smaller width than the width of the opening, and wherein said valve includes a valve key movably disposed in the cross opening to block passage of gas through the bore in one position, and allow the passage of gas through the bore in another position,
said valve key comprises a push rod slidably disposed in the cross opening and extending outwardly on each side of the neck position, with first and second buttons mounted on first and second ends of the push rod, said push rod having a narrowed section, with said push rod being moveable between said one position, in which the narrowed section is pushed out of alignment with the bore to block the passage of gas, and said other position, in which the narrowed section is pushed into alignment with the bore to allow the passage of gas,
spring means mounted between the neck portion and the first button to urge the first button and first push rod end away from the neck portion to said other position, and
catch means extending from the neck portion and moveable between an engage position, in which the catch means engages and prevents the second button and second push rod end from moving toward the neck portion, and a release position, in which the catch means is disengaged from the second button to allow the second button and second push rod end to move toward the neck portion to said one position.

* * * * *